United States Patent
Katayama et al.

(10) Patent No.: US 11,528,726 B2
(45) Date of Patent: Dec. 13, 2022

(54) WIRELESS COMMUNICATION SYSTEM, CONTROL METHOD, CONTROL APPARATUS, AND CONTROL PROGRAM

(71) Applicant: NIPPON TELEGRAPH AND TELEPHONE CORPORATION, Tokyo (JP)

(72) Inventors: Yohei Katayama, Musashino (JP); Takafumi Fujita, Musashino (JP); Kento Yoshizawa, Musashino (JP); Hideya So, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/258,535

(22) PCT Filed: Jun. 21, 2019

(86) PCT No.: PCT/JP2019/024686
§ 371 (c)(1),
(2) Date: Jan. 7, 2021

(87) PCT Pub. No.: WO2020/012918
PCT Pub. Date: Jan. 16, 2020

(65) Prior Publication Data
US 2021/0235470 A1    Jul. 29, 2021

(30) Foreign Application Priority Data

Jul. 12, 2018  (JP) .............................. JP2018-132347

(51) Int. Cl.
*H04W 72/12*  (2009.01)
*H04W 72/10*  (2009.01)
(Continued)

(52) U.S. Cl.
CPC ... *H04W 72/1247* (2013.01); *H04W 28/0242* (2013.01); *H04W 28/04* (2013.01); *H04W 72/10* (2013.01); *H04W 72/121* (2013.01)

(58) Field of Classification Search
CPC .......................................... H04W 88/00–88/06
See application file for complete search history.

(56) References Cited

U.S. PATENT DOCUMENTS

2010/0211843 A1* 8/2010 Dacosta ................ H04L 1/1877
714/748
2010/0220608 A1* 9/2010 Skillermark .......... H04L 1/1893
370/252
(Continued)

FOREIGN PATENT DOCUMENTS

JP     2014171106 A    9/2014
JP     2016220164 A   12/2016

OTHER PUBLICATIONS

Hideya So et al., Delay Performance Evaluation under Interference from Other System of Highly Reliable and Low Latency Radio Access Scheme by Utilizing Duplicated Transmissions, IEICE Technical Report, 2017.

*Primary Examiner* — San Htun

(57) ABSTRACT

A wireless communication system includes a plurality of wireless communication apparatuses that transmit a wireless frame to a terminal, and a control apparatus, and the wireless communication apparatus transmits information representing the number of retransmissions of the wireless frame to the control apparatus, and the control apparatus acquires the information representing the number of retransmissions of the wireless frame, selects the wireless communication apparatus in accordance with the number of retransmissions, and causes the selected wireless communication apparatus to start transmitting the wireless frame.

7 Claims, 15 Drawing Sheets

(51) Int. Cl.
*H04W 28/02* (2009.01)
*H04W 28/04* (2009.01)

(56) References Cited

U.S. PATENT DOCUMENTS

| | | | |
|---|---|---|---|
| 2011/0296006 A1* | 12/2011 | Krishnaswamy | H04L 45/00 |
| | | | 709/227 |
| 2012/0287775 A1* | 11/2012 | Yap | H04B 7/0413 |
| | | | 370/216 |
| 2016/0353320 A1 | 12/2016 | Hongo et al. | |
| 2017/0078890 A1* | 3/2017 | Zhu | H04W 8/08 |

* cited by examiner

| USE | REQUIRED DELAY | REQUIRED RELIABILITY | TERMINAL ALLOWED TO CONNECT |
|---|---|---|---|
| MONITORING OF APPARATUS | 20ms | 99.999% | TERMINAL 3-1,... |
| ... | ... | ... | ... |

Fig. 2

| WIRELESS COMMUNICATION APPARATUS | WIRELESS TRANSMISSION UNIT | RADIO SYSTEM | COST | USABLE FREQUENCY BAND | WIRELESS FRAME LOSS PROBABILITY | WIRELESS FRAME AVERAGE TRANSMISSION TIME |
|---|---|---|---|---|---|---|
| WIRELESS COMMUNICATION APPARATUS 6-1 | WIRELESS TRANSMISSION UNIT 60-1 | Wi-Fi | LOW | 11ch | 20% | 5ms |
| WIRELESS COMMUNICATION APPARATUS 6-2 | WIRELESS TRANSMISSION UNIT 60-2 | Wi-Fi | LOW | 6ch | 30% | 5ms |
| WIRELESS COMMUNICATION APPARATUS 6-3 | WIRELESS TRANSMISSION UNIT 60-3 | Wi-Fi | LOW | 1ch | 40% | 5ms |
| ... | ... | ... | ... | ... | ... | ... |

Fig. 3

| TERMINAL | CONNECTION RELATIONSHIP | | STATE | PRIORITY | NUMBER OF TIMES OF RETRANSMISSION FOR STARTING TRANSMISSION |
|---|---|---|---|---|---|
| | WIRELESS EQUIPMENT | | | | |
| | WIRELESS COMMUNICATION APPARATUS | WIRELESS TRANSMISSION UNIT | | | |
| TERMINAL 3-1 | WIRELESS COMMUNICATION APPARATUS 6-1 | WIRELESS TRANSMISSION UNIT 60-1 | USED | 1 | 0 |
| | WIRELESS COMMUNICATION APPARATUS 6-2 | WIRELESS TRANSMISSION UNIT 60-2 | USED | 2 | 1 |
| | WIRELESS COMMUNICATION APPARATUS 6-3 | WIRELESS TRANSMISSION UNIT 60-3 | USED | 3 | 2 |
| ... | ... | ... | ... | ... | ... |

Fig. 4

| WIRELESS COMMUNICATION APPARATUS | WIRELESS TRANSMISSION UNIT | RADIO SYSTEM | COST | USABLE FREQUENCY BAND | WIRELESS FRAME LOSS PROBABILITY | WIRELESS FRAME AVERAGE TRANSMISSION TIME |
|---|---|---|---|---|---|---|
| WIRELESS COMMUNICATION APPARATUS 6-1 | WIRELESS TRANSMISSION UNIT 60-1 | Wi-Fi | LOW | 11ch | 20% | 5ms |
| WIRELESS COMMUNICATION APPARATUS 6-2 | WIRELESS TRANSMISSION UNIT 60-2 | Wi-Fi | LOW | 6ch | 30% | 5ms |
| WIRELESS COMMUNICATION APPARATUS 6-3 | WIRELESS TRANSMISSION UNIT 60-3 | Wi-Fi | LOW | 1ch | 40% | 5ms |
| WIRELESS COMMUNICATION APPARATUS 6-4 | WIRELESS TRANSMISSION UNIT 60-4 | LTE | HIGH | Band1 | 10% | 10ms |
| | ... | ... | ... | | | |

Fig. 11

| CONNECTION RELATIONSHIP | | | STATE | PRIORITY | THE NUMBER OF RETRANSMISSIONS FOR STARTING TRANSMISSION |
|---|---|---|---|---|---|
| TERMINAL | WIRELESS EQUIPMENT | | | | |
| | WIRELESS COMMUNICATION APPARATUS | WIRELESS TRANSMISSION UNIT | | | |
| TERMINAL 3-1 | WIRELESS COMMUNICATION APPARATUS 6-1 | WIRELESS TRANSMISSION UNIT 60-1 | USED | 1 | 0 |
| | WIRELESS COMMUNICATION APPARATUS 6-2 | WIRELESS TRANSMISSION UNIT 60-2 | USED | 2 | 2 |
| | WIRELESS COMMUNICATION APPARATUS 6-3 | WIRELESS TRANSMISSION UNIT 60-3 | USED | 3 | 3 |
| | WIRELESS COMMUNICATION APPARATUS 6-4 | WIRELESS TRANSMISSION UNIT 60-4 | USED | 4 | 2 |
| ... | | ... | | ... | |

Fig. 12

WIRELESS COMMUNICATION SYSTEM, CONTROL METHOD, CONTROL APPARATUS, AND CONTROL PROGRAM

CROSS-REFERENCE TO RELATED APPLICATIONS

This application is a 371 U.S. National Phase of International Application No. PCT/JP2019/024686, filed on Jun. 21, 2019, which claims priority to Japanese Application No. 2018-132347 filed on Jul. 12, 2018. The entire disclosures of the above applications are incorporated herein by reference.

TECHNICAL FIELD

The present disclosure relates to a wireless communication system, a control method, a control apparatus, and a control program.

BACKGROUND ART

A wireless communication system may include a transmitter that performs redundant communication for transmitting a duplicated packet using a wireless frame of a plurality of frequency bands and a receiver that acquires a wireless frame having been successfully received first as a packet. Such a wireless communication system can achieve high reliability with respect to a wireless frame arrival probability (packet arrival probability) within a required delay time even in an environment where a wireless frame loss probability is high (see Non Patent Literature 1)

CITATION LIST

Non Patent Literature

Non Patent Literature 1: So, Naya, Fujita, Yoshizawa, Shimizu, " Delay Performance Evaluation under Interference from Other System of Highly Reliable and Low Latency Radio Access Scheme by Utilizing Duplicated Transmissions", Technical Report, RCC2017-42 (2017-07)

SUMMARY OF THE INVENTION

Technical Problem

However, a wireless communication system consumes an extra amount of wireless frame communication (wireless resources) for redundant communication in which a plurality of frequency bands are used simultaneously. A probability of a loss of a wireless frame may be increased by a wireless frame having an extra amount of communication consumed. Further, in a case where a single wireless access method is used, high reliability with respect to a wireless frame arrival probability may not be sufficiently obtained. In this manner, a wireless communication system of the related art cannot improve reliability with respect to a wireless frame arrival probability, while reducing the amount of communication of a wireless frame for the redundant communication.

In view of the above-described circumstances, an object of the present disclosure is to provide a wireless communication system, a control method, a control apparatus, and a control program which are capable of improving reliability with respect to a wireless frame arrival probability while reducing the amount of communication of a wireless frame for the redundant communication.

Means for Solving the Problem

An aspect of the present disclosure is a wireless communication system including a plurality of wireless communication apparatuses that transmit a wireless frame to a terminal; and a control apparatus, in which the plurality of wireless communication apparatuses transmit information representing the number of retransmissions of the wireless frame to the control apparatus, and the control apparatus acquires the information representing the number of retransmissions of the wireless frame, selects a wireless communication apparatus of the plurality of wireless communication apparatuses in accordance with the number of retransmissions, and causes the selected wireless communication apparatus to start transmitting the wireless frame.

In the wireless communication system according to the aspect of the present disclosure, the control apparatus determines a priority for each of the plurality of wireless communication apparatuses and causes a wireless communication apparatus of the plurality of wireless communication apparatuses, selected in accordance with an increase in the number of retransmissions by a wireless communication apparatus having a highest priority from among the plurality of wireless communication apparatuses, to start transmitting the wireless frame.

In the wireless communication system according to the aspect of the present disclosure, the control apparatus determines a priority for each of the plurality of wireless communication apparatus on the basis of at least one of a cost of communication of the wireless communication apparatus and a loss probability of the wireless frame of the wireless communication apparatus.

Another aspect of the present disclosure is a control method executed by a wireless communication system including a plurality of wireless communication apparatuses for transmitting a wireless frame to a terminal and a control apparatus, and the control method includes causing the plurality of wireless communication apparatuses to transmit information representing the number of retransmissions of the wireless frame to the control apparatus, and causing the control apparatus to acquire the information representing the number of retransmissions of the wireless frame, select a wireless communication apparatus of the plurality of wireless communication apparatuses in accordance with the number of retransmissions, and cause the selected wireless communication apparatus to start transmitting the wireless frame.

In the control method according to the aspect of the present disclosure, the control apparatus determines a priority for each of the plurality of wireless communication apparatus and causes a wireless communication apparatus of the plurality of wireless communication apparatuses selected in accordance with an increase in the number of retransmissions by a wireless communication apparatus having a highest priority, from among the plurality of wireless communication apparatuses, to start transmitting the wireless frame.

Still another aspect of the present disclosure is a control apparatus that controls a plurality of wireless communication apparatuses for transmitting a wireless frame to a terminal, and the control apparatus includes a reception control unit that receives, from the plurality of the wireless communication apparatuses, information representing the number of retransmissions of the wireless frame, and a request unit that selects the wireless communication apparatuses in accordance with the number of retransmissions and causes the selected wireless communication apparatuses to start transmitting the wireless frame.

In the control apparatus according to the aspect of the present disclosure, the request unit determines a priority for each of the plurality of wireless communication apparatuses and causes a wireless communication apparatus of the plurality of wireless communication apparatuses selected in accordance with an increase in the number of retransmissions by a wireless communication apparatus having a highest priority from among the plurality of wireless communication apparatuses to start transmitting the wireless frame.

Still another aspect of the present disclosure is a control program causing a computer to function as the above-described control apparatus.

Effects of the Invention

According to the present disclosure, it is possible to improve reliability with respect to a wireless frame arrival probability while reducing the amount of communication of a wireless frame for redundant communication.

BRIEF DESCRIPTION OF DRAWINGS

FIG. 2 is a diagram illustrating an example of a use management table in the first embodiment.

FIG. 3 is a diagram illustrating an example of a wireless transmission unit management table in the first embodiment.

FIG. 4 is a diagram illustrating an example of a connection state management table in the first embodiment.

FIG. 11 is a diagram illustrating an example of a wireless transmission unit management table in a second embodiment.

FIG. 12 is a diagram illustrating an example of a connection state management table in the second embodiment.

DESCRIPTION OF EMBODIMENTS

Embodiments of the present disclosure will be described in detail with reference to the drawings.

First Embodiment

Figure 1:
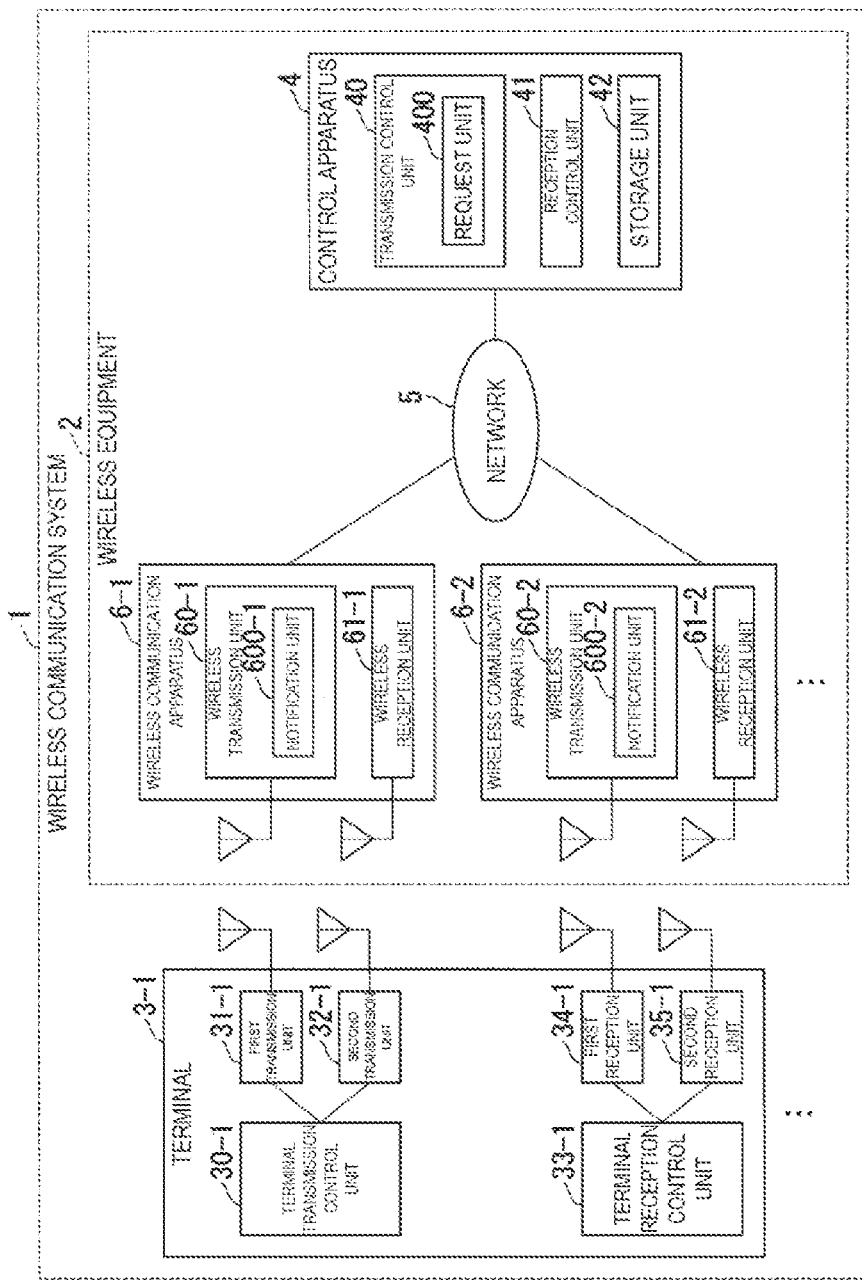
FIG. 1 is a diagram illustrating an example of a configuration of a wireless communication system according to a first embodiment.

FIG. 1 is a diagram illustrating an example of a configuration of a wireless communication system 1. The wireless communication system 1 is a system that executes wireless communication. The wireless communication system 1 includes wireless equipment 2 and one or more terminals 3. The wireless equipment 2 includes a control apparatus 4, a network 5, and a plurality of wireless communication apparatuses 6.

The terminal 3 is a terminal that executes redundant communication using a wireless frame, and is, for example, a smartphone terminal or a tablet terminal. The terminal 3 includes a terminal transmission control unit 30, a first transmission unit 31, a second transmission unit 32, a terminal reception control unit 33, a first reception unit 34, and a second reception unit 35. The terminal transmission control unit 30 and the terminal reception control unit 33 may be integrated with each other. The first transmission unit 31 and the first reception unit 34 may be integrated with each other. The second transmission unit 32 and the second reception unit 35 may be integrated with each other.

The control apparatus 4 is an information processing apparatus (transmission and reception processing device) that executes control related to transmission of a wireless frame of the wireless communication apparatus 6, and the like. The control apparatus 4 executes control of redundant communication by the wireless communication apparatuses 6. The control apparatus 4 communicates with the wireless communication apparatuses 6 through a network 5. Accordingly, the control apparatus 4 executes control related to transmission of a wireless frame of the wireless communication apparatus 6 at an end point of the redundant communication which is separated from the wireless communication apparatus 6.

The control apparatus 4 includes a transmission control unit 40 and a reception control unit 41. The functional units are implemented using software such as a large scale integration (LSI) or an application specific integrated circuit (ASIC). The functional units may be implemented by a processor such as a central processing unit (CPU) executing a program stored in a storage unit. The transmission control unit 40 and the reception control unit 41 may be integrated with each other.

The control apparatus 4 includes a storage unit 42. The storage unit 42 is, for example, a non-volatile recording medium (non-transitory recording medium) such as a flash memory or hard disk drive (HDD). The storage unit 42 may include, for example, a volatile recording medium such as a random access memory (RAM) or a register. The storage unit 42 stores programs and a data table.

The network 5 is a communication line such as a local area network (LAN). The network 5 may be a wired communication line or a wireless communication line.

The wireless communication apparatus 6 is an apparatus that executes redundant communication using a wireless frame. The wireless communication apparatus 6 executes redundant communication with the terminal 3. The wireless communication apparatuses 6 may belong to different management domains. The wireless communication apparatuses 6 communicate with the control apparatus 4 through the network 5.

The wireless communication apparatus 6 includes a wireless transmission unit 60 and a wireless reception unit 61. The functional units are realized, for example, by a processor such as a CPU executing a program stored in the storage unit. The functional units may be implemented using hardware such as an LSI or an ASIC. The wireless communication apparatus 6 may further include a storage unit.

Next, details of the terminal 3 will be described.
The terminal transmission control unit 30 executes control related to transmission of wireless frames of the first transmission unit 31 and the second transmission unit 32. The first transmission unit 31 transmits a wireless frame to the wireless communication apparatus 6 by a predetermined wireless system. The second transmission unit 32 transmits a wireless frame to the wireless communication apparatus 6 by a predetermined wireless system. The wireless system of the first transmission unit 31 and the wireless system of the second transmission unit 32 may be the same system or different systems.

The terminal reception control unit 33 executes control related to transmission of wireless frames of the first reception unit 34 and the second reception unit 35. The first reception unit 34 receives a wireless frame from the wireless communication apparatus 6 by a wireless system of the first transmission unit 31. The second transmission unit 32 receives a wireless frame from the wireless communication apparatus 6 by a wireless system of the second transmission unit 32.

Next, details of the control apparatus 4 will be described.
FIG. 2 is a diagram illustrating an example of a use management table. The use management table is a data table in which management information for the use of communication is registered. The transmission control unit 40 refers to the use management table. Items in the use management table include a use, a required delay, a required reliability, and a terminal allowed to connect.

In the use management table, the "use" represents the use of communication. The "required delay" represents a wireless frame delay time (packet delay time) required for the wireless communication system 1. The "required reliability" represents a wireless frame arrival probability (packet arrival probability) required for the wireless communication system 1. The "terminal allowed to connect" represents the terminal 3 allowed to perform communication connection with the wireless communication apparatus 6.

FIG. 3 is a diagram illustrating an example of a wireless transmission unit management table. The wireless transmission unit management table is a data table in which management information of the wireless transmission unit 60 is registered. The transmission control unit 40 refers to the wireless transmission unit management table. Items in the wireless transmission unit management table include a wireless communication apparatus, a wireless transmission unit, a wireless system, a cost, a usable frequency band, a wireless frame loss probability, and a wireless frame average transmission time.

In the wireless transmission unit management table, the "wireless communication apparatus" represents a wireless communication apparatus 6 including a wireless transmission unit 60 registered as the "wireless transmission unit". The "wireless transmission unit" is a wireless transmission unit 60 included in the wireless communication apparatus 6 registered in the "wireless communication apparatus" and represents a wireless transmission unit 60 that transmits a wireless frame. The "wireless system" represents a wireless system (for example, Wi-Fi) of communication executed by the wireless transmission unit 60. The "cost" represents the cost of communication executed by the wireless transmission unit 60. The "usable frequency band" represents a frequency band (channel) in which wireless communication executed by the wireless transmission unit 60 can be used. The "wireless frame loss probability" represents a probability of loss of a wireless frame between the terminal 3 and the wireless communication apparatus 6. The "wireless frame average transmission time" represents an average of transmission times of wireless frames between the terminal 3 and the wireless communication apparatus 6.

FIG. 4 is a diagram illustrating an example of a connection state management table. The connection state management table is a data table in which management information of a connection state of communication between the terminal 3 and the wireless communication apparatus 6 is registered. The transmission control unit 40 refers to the connection state management table. Items in the connection state management table include a connection relationship, a state, a priority, and a number of retransmissions for starting transmission. Items of the connection relationship include a terminal and wireless equipment. Items of wireless equipment include a wireless communication apparatus and a wireless transmission unit.

In the connection state management table, the "terminal" represents the terminal 3 that communicates with the wireless communication apparatus 6 registered as the "wireless communication apparatus". The "wireless communication apparatus" is a wireless communication apparatus 6 that communicates with the terminal 3 registered as the "terminal". The "wireless transmission unit" is a wireless transmission unit 60 that executes communication in the wireless communication apparatus 6 registered as the "wireless communication apparatus". The "state" represents whether the wireless transmission unit 60 registered as the "wireless transmission unit" is being used for communication. The "priority" represents the priority of the wireless transmission unit 60 registered as the "wireless transmission unit". A lower priority value indicates higher priority. The "number of retransmissions for starting transmission" represents the number of retransmissions for starting transmission of a wireless frame by the wireless transmission unit 60 registered as the "wireless transmission unit". The number of retransmissions represents the number of retransmissions of a wireless frame by a wireless transmission unit 60-1 having the highest priority. In FIG. 4, for example, in a case where the number of retransmissions of a wireless frame by the wireless transmission unit 60-1 having the highest priority is one, the transmission control unit 40 starts transmitting a wireless frame by a wireless transmission unit 60-2 having the second highest priority.

Referring back to FIG. 1, description of details of the control apparatus 4 will continue. The transmission control unit 40 includes a request unit 400. The request unit 400 acquires information representing the cost of communication performed by the wireless transmission unit 60 from the wireless transmission unit management table as illustrated in FIG. 3.

The request unit 400 sets a priority for each of the wireless transmission units 60 in the connection state management table as illustrated in FIG. 4. The request unit 400 sets a priority for each of the wireless transmission units 60 on the basis of the cost of communication and the wireless frame loss probability as illustrated in FIG. 3.

The request unit 400 sets a priority such that the wireless transmission unit 60 having a lower communication cost is used for communication with higher priority. That is, the request unit 400 sets a higher priority for the wireless transmission unit 60 having a lower communication cost. The request unit 400 sets a priority such that the wireless transmission unit 60 having a lower wireless frame loss probability is for communication with higher priority. That is, the request unit 400 sets a higher priority for the wireless transmission unit 60 having a lower wireless frame loss probability.

Here, the request unit 400 may give priority to the communication cost over the wireless frame loss probability. That is, the request unit 400 may set, for the wireless transmission unit 60 having a low communication cost, a priority higher than a priority set for the wireless transmission unit 60 having a low wireless frame loss probability.

The request unit 400 sets the "number of retransmissions for starting transmission" in the connection state management table as illustrated in FIG. 4, on the basis of the "wireless frame loss probability" in the wireless transmission unit management table as illustrated in FIG. 3. The request unit 400 sets a small value for the "number of retransmissions for starting transmission" of the wireless transmission unit 60 having a low wireless frame loss probability. For example, the request unit 400 sets 0 for a "number of retransmissions for starting transmission" of the wireless transmission unit 60-1 having the lowest wireless frame loss probability. The request unit 400 sets 1 for a "number of retransmissions for starting transmission" of the wireless transmission unit 60-2 having the second lowest wireless frame loss probability. The request unit 400 sets 2 for a "number of retransmissions for starting transmission" of a wireless transmission unit 60-3 having the third lowest wireless frame loss probability.

The request unit 400 requests one or more wireless transmission units 60 to start or stop transmitting or retransmitting a wireless frame on the basis of a retransmission state or a transmission completion state of each wireless frame and a priority of each wireless transmission unit 60.

The retransmission state of a wireless frame represents the number of retransmissions of a wireless frame or a retransmission time-out of each wireless transmission unit 60. The retransmission time-out indicates the time, from retransmission of a wireless frame to reception of a response signal (ACK wireless frame) by the wireless reception unit 61 from the terminal 3 that receives the retransmitted wireless frame, has timed out.

The request unit 400 requests the wireless transmission unit 60 to start transmitting or retransmitting a wireless frame on the basis of a result of comparison between the "number of retransmissions for starting transmission" in the connection state management table as illustrated in FIG. 4 and the number of retransmissions notified by the wireless transmission unit 60-1 having the highest priority.

The request unit 400 causes more wireless transmission units 60 to start transmitting (retransmitting) a wireless frame with an increase of the number of retransmissions of a wireless frame in the wireless transmission unit 60-1 having the highest priority. Thereby, the request unit 400 can reduce the amount of communication of a wireless frame for redundant communication.

Here, the request unit 400 uses, with higher priority, a wireless transmission unit 60 having a high priority which is set (a wireless transmission unit 60 having a low priority value) for communication. For example, in a case where the number of retransmissions of a wireless frame by the wireless transmission unit 60-1 having the highest priority is one, the request unit 400 causes the wireless transmission unit 60-2 having the second highest priority to start transmitting a wireless frame. For example, in a case where the number of retransmissions of a wireless frame by the wireless transmission unit 60-1 having the highest priority is two, the request unit 400 causes the wireless transmission unit 60-3 having the third highest priority to start transmitting a wireless frame.

The reception control unit 41 acquires a packet from the reception control unit 41. For example, the reception control unit 41 acquires a response signal of the packet from the reception control unit 41.

Next, details of the wireless communication apparatus 6 will be described. The wireless transmission unit 60 includes a notification unit 600 and an antenna. The notification unit 600 notifies the request unit 400 of a retransmission state (the number of retransmissions) of a wireless frame transmitted from the wireless communication apparatus 6 to the terminal 3. The notification unit 600 notifies the request unit 400 of a transmission completion (ACK) of a wireless frame transmitted to the terminal 3 from the wireless communication apparatus 6. The notification unit 600 can, by notifying the request unit 400 of the retransmission state and the transmission completion of a wireless frame, separate an end point of redundant communication from the terminal 3 and the wireless communication apparatus 6 and set the end point of the redundant communication to be the control apparatus 4.

The wireless reception unit 61 acquires a wireless frame of a packet from the terminal 3-1. The wireless reception unit 61 transmits the packet to the reception control unit 41. For example, the wireless reception unit 61 acquires a wireless frame of a response signal of the packet from the terminal 3-1. The wireless reception unit 61 transmits the response signal of the packet to the reception control unit 41.

Figure 5:
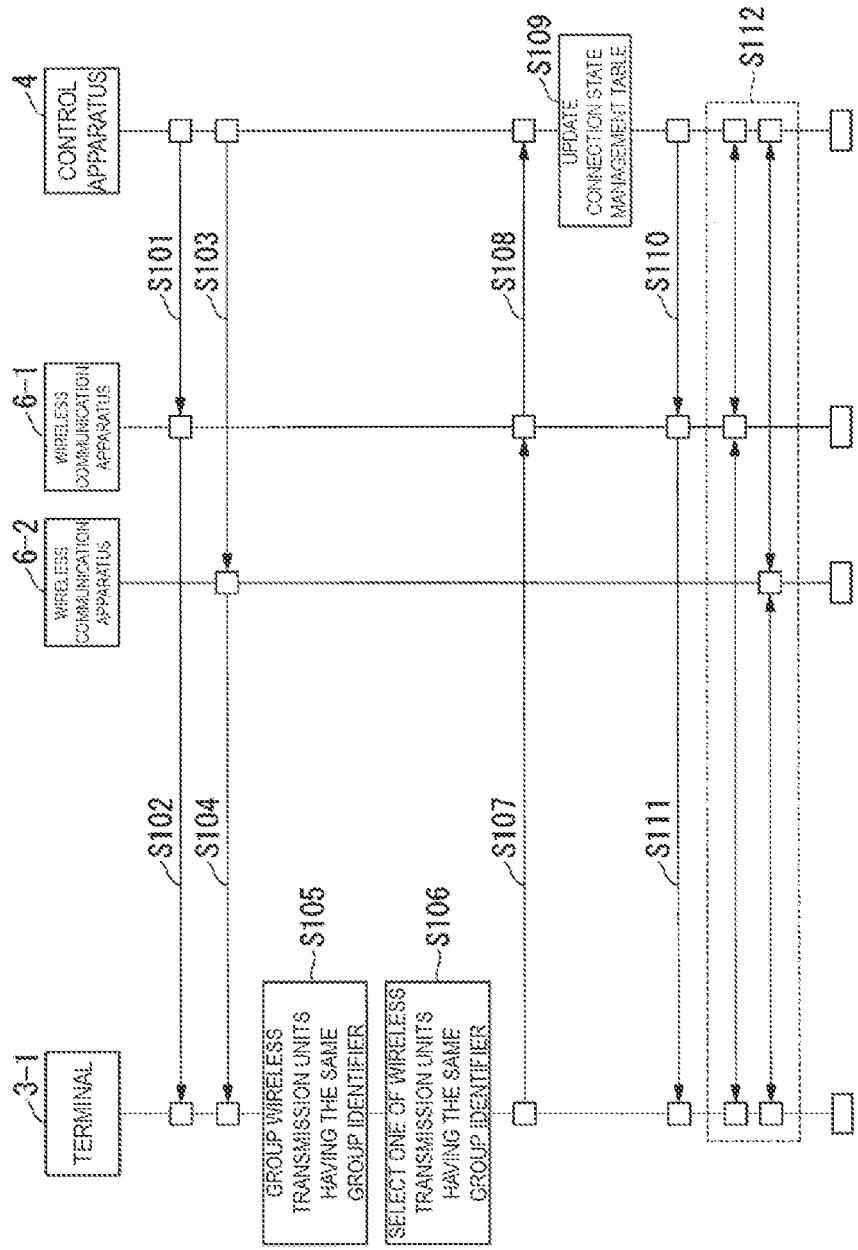
FIG. 5 is a sequence diagram illustrating examples of connection preprocessing and connection processing in the first embodiment.

Next, operations of the wireless communication system 1 will be described. FIG. 5 is a sequence diagram illustrating examples of connection preprocessing and connection processing. In FIG. 5, the connection preprocessing is processing from step S101 to step S111. The connection processing is the processing of step S112.

The control apparatus 4 transmits a group identifier (for example, an identifier of the control apparatus 4) representing one or more wireless transmission units 60 that can be used for redundant communication to the wireless communication apparatus 6-1 (step S101). The wireless communication apparatus 6-1 transmits a wireless frame including a group identifier and an identifier of the wireless communication apparatus 6-1 to the terminal 3-1 (step S102).

The control apparatus 4 transmits the group identifier to the wireless communication apparatus 6-1 (step S103). The wireless communication apparatus 6-1 transmits a wireless frame including a group identifier and an identifier of the wireless communication apparatus 6-2 to the terminal 3-1 (step S104).

The terminal 3-1 groups the wireless transmission units 60 having the same group identifier (step S105). The terminal 3-1 selects one wireless transmission unit 60 from among the grouped one or more wireless transmission units 60 having the same group identifier (step S106). The terminal 3-1 notifies the wireless communication apparatus 6-1 of information representing a connection request. The information representing the connection request includes information representing a list of one or more wireless transmission units 60 to which the terminal 3-1 can connect among the wireless transmission units 60 having the same group identifier, and information representing the use of the communication (step S107). The wireless communication apparatus 6-1 transmits the information representing the connection request to the control apparatus 4 (step S108).

The control apparatus 4 updates the connection state management table on the basis of the information representing the connection request (step S109). The control apparatus 4 notifies the wireless communication apparatus 6-1 of information representing a response to the connection request. The information representing the response to the connection request includes information representing a list of wireless transmission units 60 the terminal 3-1 connects to and uses for communication (step S110). The wireless communication apparatus 6-1 notifies the terminal 3-1 of the information representing the response to the connection request using a wireless frame (step S111). The control apparatus 4, the wireless communication apparatus 6-1, and the terminal 3-1 execute predetermined connection processing (step S112).

Figure 6:
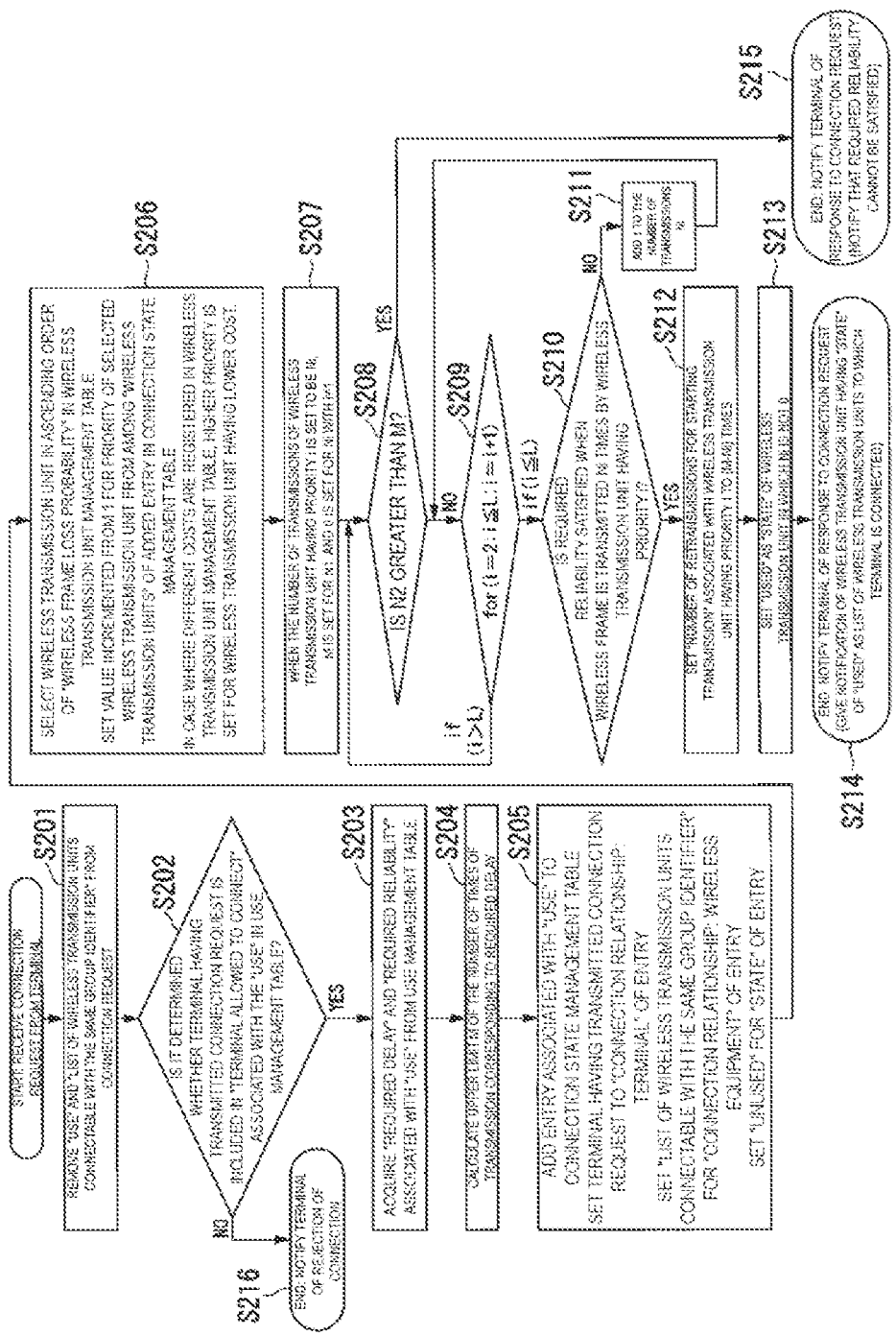
FIG. 6 is a flowchart illustrating an example of updating processing of a connection state management table in the first embodiment.

FIG. 6 is a flowchart illustrating an example of updating processing for a connection state management table. The updating processing corresponds to the processing of step S109 in FIG. 5. In a case where information representing a connection request is received from the terminal 3, the request unit 400 extracts, from the information representing the connection request, information representing a list of one or more wireless transmission units 60 to which the terminal 3-1 can connect among the wireless transmission units 60 having the same group identifier, and information representing the use. A length L of the list represents the number of wireless transmission units 60 to which the terminal 3 connects (step S201).

The request unit 400 determines whether the terminal 3-1 having transmitted the connection request is included in the "terminal allowed to connect" associated with the "use" in the use management table as illustrated in FIG. 2 (step S202). In a case where the terminal 3-1 having transmitted the connection request is included in the "terminal allowed to connect" (step S202: YES), the request unit 400 acquires the "required delay" and the "required reliability" associated with the "use" from the use management table (step S203). The request unit 400 calculates an upper limit M of the number of transmissions corresponding to the time of the acquired required delay (step S204).

The request unit 400 adds an entry associated with the "use" to the connection state management table. For example, the request unit 400 sets the terminal 3-1 having transmitted the connection request for the "connection relationship: terminal" of the entry. The request unit 400 sets a list of one or more wireless transmission units 60 to which the terminal 3-1 can connect to among the wireless transmission units 60 having the same group identifier for the "connection relationship: wireless equipment" of the entry. The request unit 400 sets "unused" for the "state" of the entry (step S205).

The request unit 400 selects the wireless transmission unit 60 for each terminal 3 in ascending order of "wireless frame loss probability" in the wireless transmission unit management table. The request unit 400 sets a value incremented from 1 for a priority of the selected wireless transmission unit 60 among the wireless transmission units 60 in the "wireless transmission unit" of the added entry in the connection state management table. In a case where different costs are registered in the wireless transmission unit management table, the request unit 400 sets a higher priority for the wireless transmission unit 60 having a lower cost of communication (step S206).

Hereinafter, the number of transmissions of the wireless transmission unit 60 having a priority value i will be referred to as "Ni". The request unit 400 sets M for N1 having a priority i of 1, and sets 0 for Ni having a priority i other than 1 (step S207).

In FIG. 6, an initial value of the priority i is 2 in step S208 and the subsequent steps. The request unit 400 adds 1 to the value of the priority i. The request unit 400 determines whether N2 is greater than M (step S208). In a case where N2 is equal to or less than M (step S208: NO), the request unit 400 determines whether the value of the priority i is equal to or less than a length L (step S209).

In a case where the value of the priority i exceeds the length L (step S209: i >L), the request unit 400 returns the processing back to step S208. In a case where the value of the priority i is equal to or less than the length L (step S209: i≤L), the request unit 400 determines whether the required reliability is satisfied in a case where a wireless frame is transmitted Ni times in the wireless transmission unit 60 having the priority i (step S210). In a case where the required reliability is not satisfied (step S210: NO). The request unit 400 adds 1 to the number of transmissions Ni (step S211). The request unit 400 returns the processing back to step S209.

In a case where the required reliability is satisfied (step S210: YES), the request unit 400 sets the "number of retransmissions for starting transmission" associated with the wireless transmission unit 60 having the priority i to (M-Ni) times in the connection state management table as illustrated in FIG. 4 (step S212). The request unit 400 sets "used" for the "state" of the wireless transmission unit 60 with the number of transmissions Ni that is not 0 in the connection state management table (step S213). The request unit 400 notifies the terminal 3-1 of information representing a response to a connection request. That is, the request unit 400 notifies the terminal 3-1 of a list of the wireless transmission units 60 with the "state" set to "used" in the connection state management table as illustrated in FIG. 4, as the list of the wireless transmission units 60 to which the terminal 3-1 connects (step S214).

In a case where the number of transmissions N2 exceeds M (step S208: YES), the request unit 400 transmits the response to the connection request to the terminal 3-1. That is, the request unit 400 notifies the terminal 3-1 that the required reliability cannot be satisfied (step S215).

In a case where the terminal 3-1 having transmitted the connection request is not included in the "terminal allowed to connect" (step S202: NO), the request unit 400 notifies the terminal 3-1 of rejection of connection (step S216).

Figure 7:
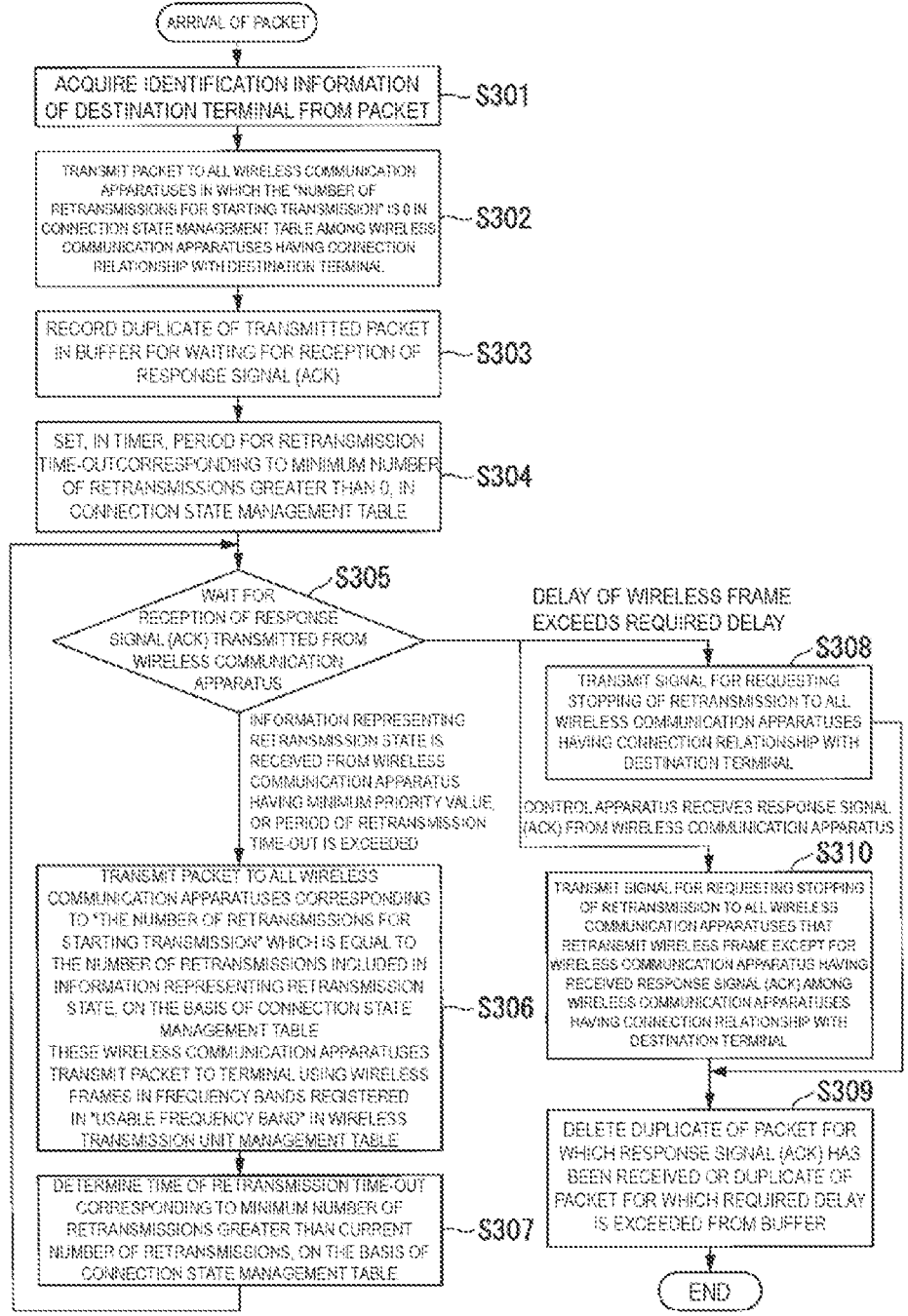
FIG. 7 is a flowchart illustrating examples of transmission processing and reception processing of a wireless frame in the first embodiment.

FIG. 7 is a flowchart illustrating examples of transmission processing and reception processing of a wireless frame (packet). In a case where a packet transmitted to the terminal 3-1 has arrived at the control apparatus 4, the request unit 400 acquires, from the packet, identification information of the terminal 3-1 which is a destination (step S301). The request unit 400 transmits the packet to all of the wireless communication apparatuses 6 in which the "number of retransmissions for starting transmission" is 0 in the connection state management table among the wireless communication apparatuses 6 having a connection relationship with the terminal 3-1 which is a destination (step S302).

The request unit 400 records a duplicate of the transmitted packet in a buffer for waiting for the reception of a response signal (ACK) (step S303). The request unit 400 sets, in a timer, a period for retransmission time-out corresponding to a minimum number of retransmissions greater than 0 in the connection state management table (step S304). The request unit 400 waits for the reception of the response signal (ACK) transmitted from the wireless communication apparatus 6 (step S305).

In step S305, in a case where the request unit 400 has received information representing a retransmission state from the wireless communication apparatus 6 having the smallest priority value, the request unit 400 transmits, on the basis of the connection state management table, a packet to all of the wireless communication apparatuses 6 corresponding to the "number of retransmissions for starting transmission" which is equal to the number of retransmissions included in the information representing the retransmission state. In a case where the period for the retransmission time-out is elapsed, the request unit 400 transmits the packet to all of the wireless communication apparatuses 6 corresponding to the "number of retransmissions for starting transmission" which is equal to the number of retransmissions included in the information representing the retransmission state. In a case where the wireless communication apparatus 6 has acquired the packet, the wireless communication apparatus 6 transmits the packet to the terminal 3-1 using a wireless frame in a frequency band registered as the "usable frequency band" in the wireless transmission unit management table (step S306).

The request unit 400 determines the period for retransmission time-out corresponding to a minimum number of retransmissions greater than the current retransmission number of the wireless transmission unit 60-1, on the basis of the connection state management table. For example, the request unit 400 determines the period for the retransmission time-out on the basis of a result obtained by multiplying a wireless frame average transmission time by the number of retransmissions (step S307). The request unit 400 returns the processing back to step S305.

In step S305, in a case where a delay of a wireless frame exceeds a required delay, the request unit 400 transmits a signal for requesting stopping of retransmission of a wireless frame to all of the wireless communication apparatuses 6 having a connection relationship with the terminal 3-1 which is a destination (step S308). The request unit 400 deletes a duplicate of a packet for which a response signal (ACK) has been received or a duplicate of a packet for which a required delay has been exceeded from the buffer to wait to receive a response signal (step S309).

In step S305, in a case where the control apparatus 4 has received a response signal (ACK) from the wireless communication apparatus 6, the request unit 400 transmits a signal for requesting stop of retransmission of a wireless frame to all of the wireless communication apparatuses 6 that are retransmitting a wireless frame, except for the wireless communication apparatus 6 having received a response signal, among the wireless communication apparatuses 6 having a connection relationship with the terminal 3-1 which is a destination (step S310). The request unit 400 proceeds to processing of step S309.

Figure 8:
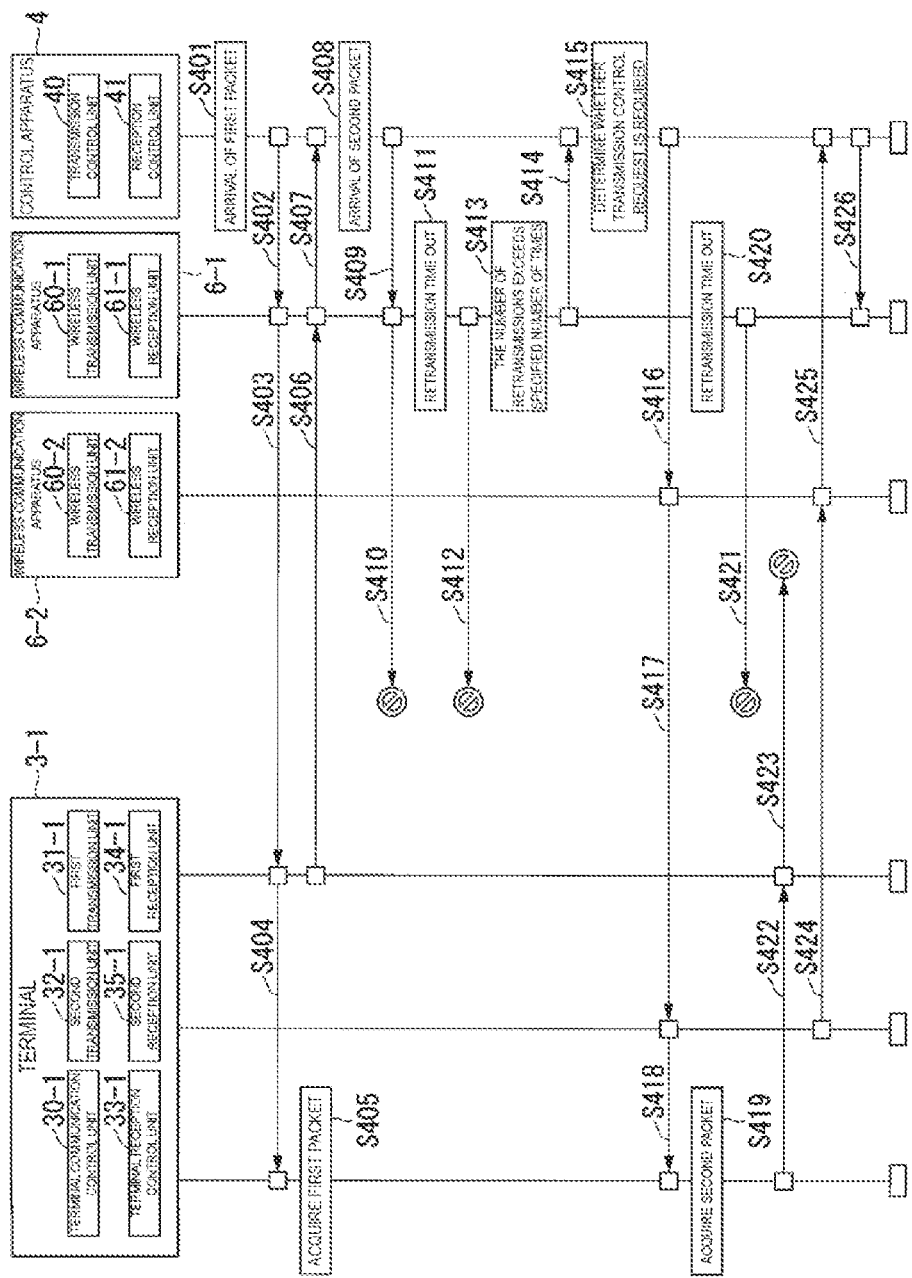
FIG. 8 is a sequence diagram illustrating examples of transmission processing and reception processing of a wireless frame in the first embodiment.

FIG. 8 is a sequence diagram illustrating examples of transmission processing and reception processing of a wireless frame (packet). In step S301 illustrated in FIG. 7, the transmission control unit 40 acquires a first packet and duplicates the first packet (step S401). The transmission control unit 40 requests the wireless transmission unit 60-1 to transmit the first packet (step S402). The wireless transmission unit 60-1 transmits a wireless frame of the first packet to a first reception unit 34-1 (step S403).

The first reception unit 34-1 transmits the first packet included in the wireless frame to a terminal reception control unit 33-1 (step S404). The terminal reception control unit 33-1 acquires the first packet (step S405). The first transmission unit 31-1, after successfully receiving the first packet, transmits a wireless frame of a response signal (ACK) of the first packet to the wireless reception unit 61-1 (step S406). The wireless reception unit 61-1 transmits the response signal of the first packet to the reception control unit 41 (step S407).

In step S301 illustrated in FIG. 7, the transmission control unit 40 acquires a second packet and duplicates the second packet (step S408). The transmission control unit 40 requests the wireless transmission unit 60-1 to start transmitting the second packet (step S409). The wireless transmission unit 60-1 transmits a wireless frame of the second packet to the first reception unit 34-1. In FIG. 8, the transmitted wireless frame of the second packet is lost (step S410).

The first reception unit 34-1 transmits a response signal (ACK wireless frame), and the time until the wireless reception unit 61-1 receives the transmitted response signal times out (step S411). The wireless transmission unit 60-1 retransmits the wireless frame of the second packet to the first reception unit 34-1. In FIG. 8, the retransmitted wireless frame of the second packet is lost (step S412). Thereby, the number of retransmissions of the wireless frame of the second packet exceeds a predetermined number (step S413).

The wireless transmission unit 60-1 notifies the reception control unit 41 of a retransmission state (the number of retransmissions) of the second packet (step S414). In step S305 illustrated in FIG. 7, the transmission control unit 40 determines whether it is necessary to request the control of transmission, on the basis of the retransmission state of the second packet (step S415).

In step S306 illustrated in FIG. 7, the transmission control unit 40 requests the wireless transmission unit 60-2 to transmit the second packet (step S416). The wireless transmission unit 60-2 transmits the wireless frame of the second packet to a second reception unit 35-1 (step S417). The second reception unit 35-1 transmits the second packet included in the wireless frame to the terminal reception control unit 33-1 (step S418). The terminal reception control unit 33-1 acquires the second packet (step S419).

The time, from transmission of a response signal (ACK wireless frame) by the first reception unit 34-1 to reception of the transmitted response signal by the wireless reception unit 61-1, times out (step S420). The wireless transmission unit 60-1 retransmits the wireless frame of the second packet to the first reception unit 34-1. In FIG. 8, the retransmitted wireless frame of the second packet is lost (step S421).

Even when the first reception unit 34-1 has not received the wireless frame of the second packet, the second reception unit 35-1 has received the wireless frame of the second packet and thus the terminal transmission control unit 30-1 causes the wireless frame of the response signal of the second packet to be transmitted not only from the second transmission unit 32-1 but also from the first transmission unit 31-1. For this reason, the terminal transmission control unit 30-1 transmits the response signal of the second packet to the first transmission unit 31-1 (step S422). The first transmission unit 31-1 transmits the wireless frame of the response signal of the second packet to the wireless reception unit 61-1. In FIG. 8, the transmitted wireless frame of the response signal of the second packet is lost (step S423).

The second reception unit 35-1 has successfully received the wireless frame of the second packet, and thus the second transmission unit 32-1 transmits a wireless frame (ACK wireless frame) of the response signal of the second packet to a wireless reception unit 61-2 (step S424). The wireless reception unit 61-2 transmits the response signal of the second packet to the reception control unit 41 (step S425).

In step S310 illustrated in FIG. 7, even when the wireless reception unit 61-1 has not received the wireless frame of the response signal of the second packet, the wireless reception unit 61-2 has received the wireless frame of the response signal of the second packet, the transmission control unit 40 requests not only the wireless transmission unit 60-2 but also the wireless transmission unit 60-1 to stop retransmitting the second packet. For this reason, the transmission control unit 40 requests the wireless transmission unit 60-1 to stop retransmitting the second packet (step S426).

Figure 9:
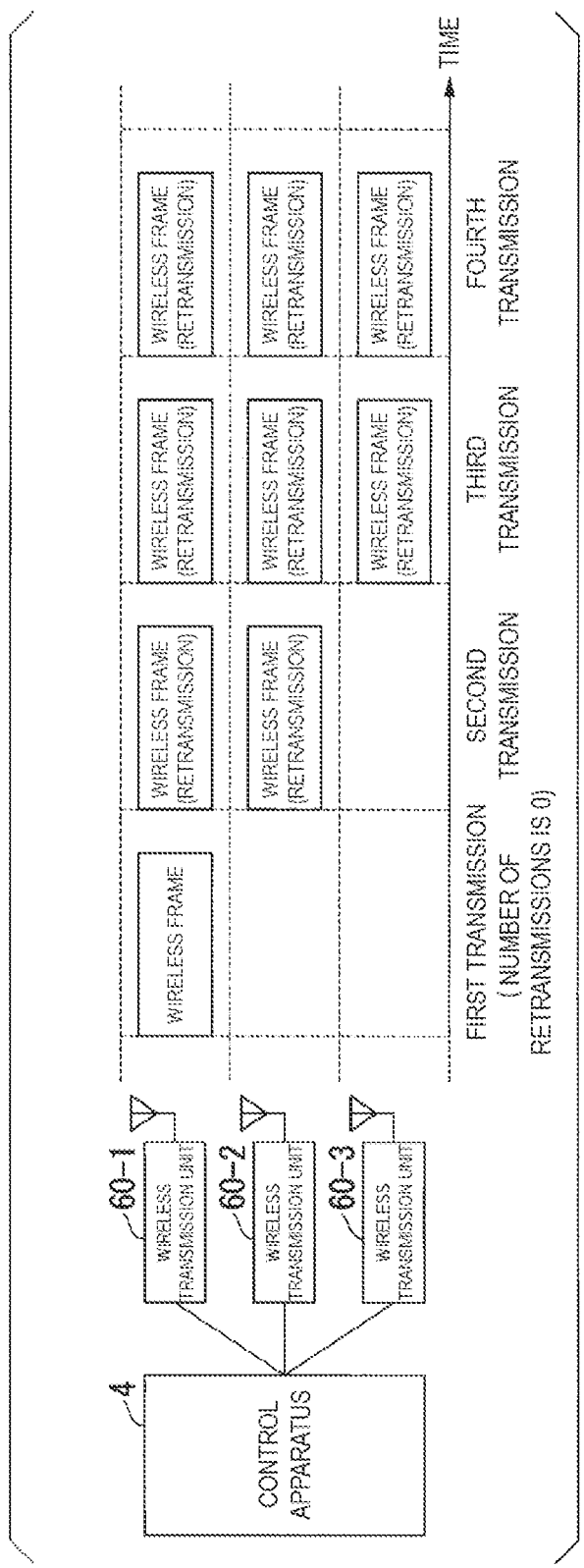
FIG. 9 is a diagram illustrating an example of a transmission pattern of a wireless frame in the first embodiment.

FIG. 9 is a diagram illustrating an example of a transmission pattern of a wireless frame. In FIG. 9, a wireless frame arrival probability is highest in a channel of the wireless transmission unit 60-1. In the channel of the wireless transmission unit 60-3, a wireless frame arrival probability is lowest.

The control apparatus 4 causes the timing at which the wireless transmission unit 60-2 starts transmitting a wireless frame to be later than the timing at which the wireless transmission unit 60-1 having the highest wireless frame arrival probability starts transmitting a wireless frame. The control apparatus 4 causes the timing at which the wireless transmission unit 60-3 having the lowest wireless frame arrival probability starts transmitting a wireless frame to be later than the timing at which the wireless transmission unit 60-2 starts transmitting a wireless frame.

The control apparatus 4 controls the operation of each of the wireless transmission units 60 so that a channel of the wireless transmission unit 60-1 having the highest wireless frame arrival probability is used with the highest priority for communication, and thus the probability of a wireless frame being retransmitted is low. Accordingly, the control apparatus 4 can improve reliability with respect to a wireless frame arrival probability while reducing the amount of communication of a wireless frame for redundant communication.

Figure 10:
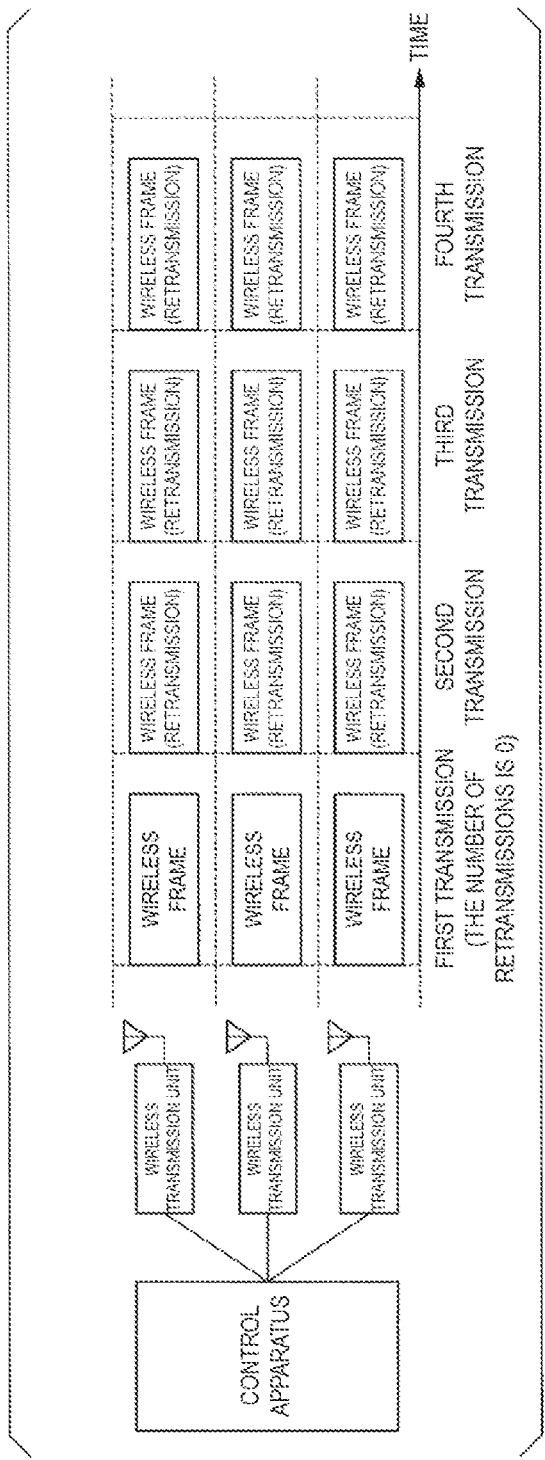
FIG. 10 is a diagram illustrating an example of a transmission pattern of a wireless frame in the related art.

An example of a transmission pattern of a wireless frame in the related art is illustrated in FIG. 10 for comparison with FIG. 9.

FIG. 10 is a diagram illustrating an example of a transmission pattern of a wireless frame in the related art. Each of the wireless transmission units improves the reliability with respect to a wireless frame arrival probability by reproducing a wireless frame and executing redundant communication when the wireless resources congestion occurs. In FIG. 10, three same wireless frames duplicated are transmitted at the same time. The wireless transmission units may excessively consume wireless resources by executing such redundant communication.

As described above, the wireless communication system 1 according to the first embodiment includes the plurality of wireless communication apparatuses 6 and the control apparatus 4. The plurality of wireless communication apparatuses 6 transmit a wireless frame to the terminal 3. The wireless communication apparatus 6 transmits information representing the number of retransmissions of a wireless frame to the control apparatus. The control apparatus 4 acquires information representing the number of retransmissions of a wireless frame. The control apparatus 4 selects the wireless communication apparatus 6 (wireless transmission unit 60) in accordance with the number of retransmissions. The control apparatus 4 causes the selected wireless communication apparatus 6 to start transmitting a wireless frame.

Thereby, the wireless communication system 1 of the first embodiment can improve reliability with respect to a wireless frame arrival probability while reducing the amount of communication of a wireless frame for redundant communication.

The control apparatus 4 controls the plurality of wireless communication apparatuses 6. The control apparatus 4 includes the reception control unit 41 and the request unit 400. The reception control unit 41 receives information representing the number of retransmissions of a wireless frame from the wireless communication apparatus. The request unit 400 selects a wireless communication apparatus in accordance with the number of retransmissions, and causes the selected wireless communication apparatus to start transmitting a wireless frame.

Thereby, the control apparatus 4 of the first embodiment can improve reliability with respect to a wireless frame arrival probability while reducing the amount of communication of a wireless frame for redundant communication.

The wireless communication system 1 can execute redundant communication using the plurality of wireless transmission units 60 connected to each other via a wired network and belonging to different management domains. The wireless communication system 1 can use the plurality of wireless transmission units 60 at the same time and can improve reliability with respect to a wireless frame arrival probability using the plurality of wireless transmission units 60 even when a wireless frame arrival probability is low in all frequency bands in which a single wireless transmission unit 60 can be used.

The request unit 400 determines a priority for each wireless communication apparatus 6 (wireless transmission unit 60). The request unit 400 determines a priority for each wireless communication apparatus 6 on the basis of at least one of the cost of communication of the wireless communication apparatus 6 and a wireless frame loss probability of the wireless communication apparatus 6. The request unit 400 causes the wireless communication apparatus 6, selected in accordance with an increase in the number of retransmissions by the wireless communication apparatus 6 having the highest priority among the plurality of wireless communication apparatuses, to start transmitting a wireless frame. In a case where a plurality of wireless access systems having different communication costs and reliabilities are used simultaneously, the request unit 400 uses, with priority, the wireless transmission unit 60 having a high priority for communication, the priority being determined in accordance with costs or the like.

Thereby, the wireless communication system 1 can improve reliability with respect to a wireless frame arrival probability while reducing the cost of communication, and can expand the area of communication through cooperation of cellular networks of different types. In addition, the wireless communication system 1 can improve communication continuity through cooperation of cellular networks of different types.

The wireless communication system 1 can significantly reduce influence, on wireless resources, of redundant communication executed in an environment with wireless resource congestion. The wireless communication system 1 can improve reliability with respect to a wireless frame arrival probability of image data having a large amount of data, or the like.

The control apparatus 4 can control the operation of the wireless communication apparatus 6 at an end point of redundant communication separated from the wireless communication apparatus 6. The control apparatus 4 can provide an interface of a multi-wireless access technology (mRAT) to a wireless communication apparatus 6 having a different management domain.

Second Embodiment

The second embodiment is different from the first embodiment in that average transmission times (wireless frame lengths) of wireless frames transmitted from different wireless transmission units 60 are different from each other. In the second embodiment, differences from the first embodiment will be described.

FIG. 11 is a diagram illustrating an example of a wireless transmission unit management table. In FIG. 11, a wireless transmission unit 60-4 is further registered in the wireless transmission unit management table illustrated in FIG. 3. The wireless system of the wireless transmission unit 60-4 is long term evolution (LTE), rather than Wi-Fi. The cost of communication of the wireless transmission unit 60-4 is higher than the costs of communication of the other wireless transmission units 60.
A frequency usable by the wireless transmission unit 60-4 is "Band1". A wireless frame loss probability of the wireless transmission unit 60-4 is 10%. An average transmission time of a wireless frame of the wireless transmission unit 60-4 is 10 ms.

FIG. 12 is a diagram illustrating an example of a connection state management table. In FIG. 12, the wireless transmission unit 60-4 is further registered in the connection state management table illustrated in FIG. 3. The state of communication of the wireless transmission unit 60-4 is "used". A priority of the wireless transmission unit 60-4 is "4". The "number of retransmissions for starting transmission" of the wireless transmission unit 60-4 is "2".

Average transmission times (wireless frame lengths) of wireless frames transmitted from different wireless transmission units 60 are different from each other, and thus a request unit 400 executes skip processing according to the proportion of wireless frame lengths in the processes from step S209 to step S111 illustrated in FIG. 6. For example, a wireless frame length of a wireless frame having a transmission time of 10 ms is twice a wireless frame length of a wireless frame having a transmission time of 5 ms. For this reason, a frequency at which the request unit 400 increments the number of transmissions Ni of a wireless frame having a transmission time of 10 ms by the wireless transmission unit 60-4 is set to be once every two times in step S211 illustrated in FIG. 6.

Figure 13:
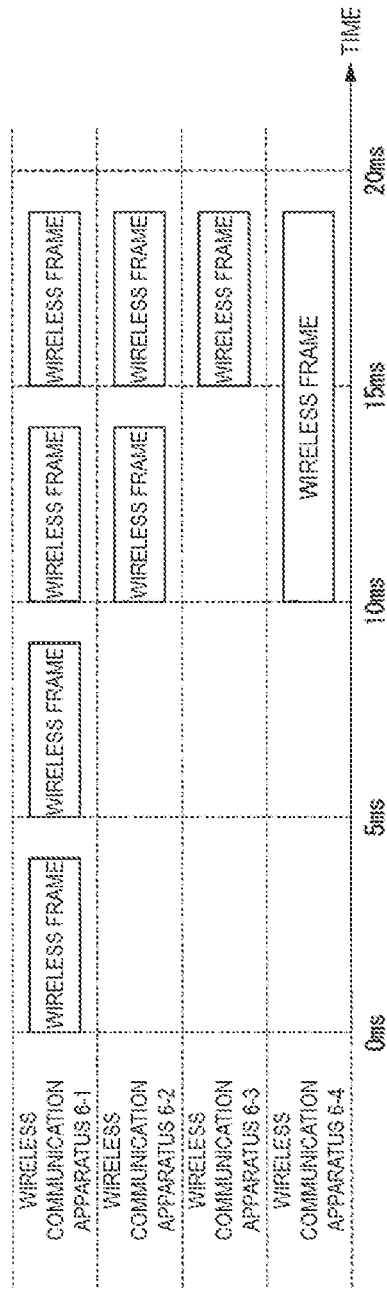
FIG. 13 is a diagram illustrating an example of a transmission pattern of wireless frames having different average transmission times in the second embodiment.

FIG. 13 is a diagram illustrating an example of a transmission pattern of wireless frames having different average transmission times. A wireless communication apparatus 6-1 transmits one wireless frame from 0 ms to 5 ms on the time axis. The wireless communication apparatus 6-1 retransmits one wireless frame from 5 ms to 10 ms on the time axis.

The wireless communication apparatus 6-1 retransmits one wireless frame from 10 ms to 15 ms on the time axis. A wireless communication apparatus 6-2 having the second highest priority retransmits one wireless frame. The wireless communication apparatus 6-4 having the second highest priority retransmits one wireless frame having a double wireless frame length.

The wireless communication apparatus 6-1 retransmits one wireless frame from 15 ms to 20 ms on the time axis. The wireless communication apparatus 6-2 having the second highest priority retransmits one wireless frame. The wireless communication apparatus 6-4 having the second highest priority keeps transmitting one wireless frame having a double wireless frame length. A wireless communication apparatus 6-3 having the third highest priority retransmits one wireless frame.

A probability that the wireless frames will be retransmitted from 10 ms to 20 ms in the time axis is equal to or less than 4%. An expected value of the number of transmissions of a wireless frame for one packet will be set to 1.29 in accordance with a "wireless frame loss probability" in the wireless transmission unit management table as illustrated in FIG. 11.

Figure 14:
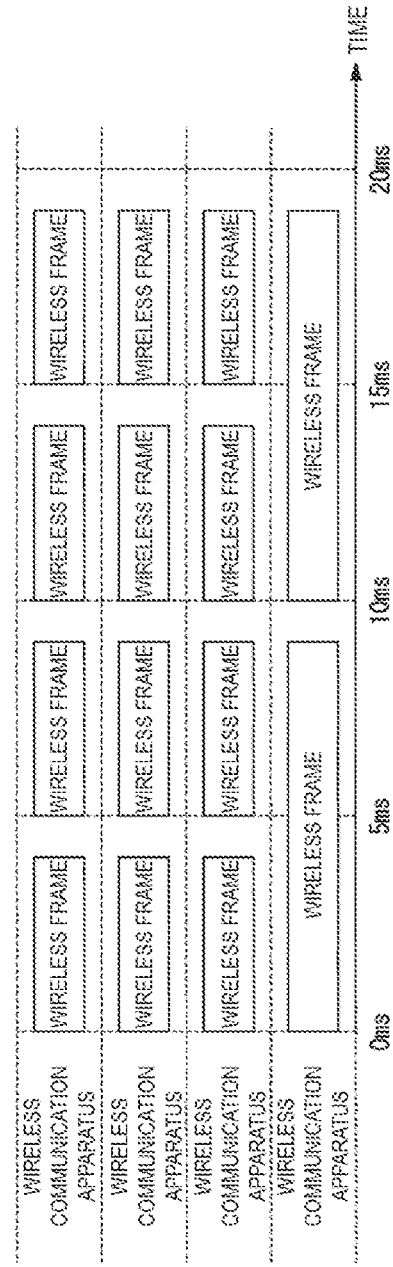
FIG. 14 is a diagram illustrating an example of a transmission pattern of wireless frames having different average transmission times in the related art.

An example of a transmission pattern of a wireless frame in the related art is illustrated in FIG. 14 for comparison with FIG. 13.

FIG. 14 is a diagram illustrating an example of a transmission pattern of wireless frames having different average transmission times in the related art. In FIG. 14, the control apparatus determines the number of wireless frames to be transmitted at the same time (a minimum degree of redundancy) in accordance with a wireless frame loss probability so as to satisfy required reliability. An expected value of the number of transmissions of a wireless frame for one packet is set to 4.07 in accordance with a "wireless frame loss probability" in the wireless transmission unit management table as illustrated in FIG. 11.

As described above, the request unit 400 of the second embodiment changes the frequency of transmission of a wireless frame in the wireless transmission unit 60 in accordance with the proportion of a wireless frame length. Thereby, the wireless communication system 1 of the second embodiment can improve reliability with respect to a wireless frame arrival probability while reducing the amount of communication of a wireless frame for redundant communication, even when average transmission times (wireless frame lengths) of wireless frames transmitted from different wireless transmission units 60 are different from each other.

Third Embodiment

A third embodiment is different from the first and second embodiments in that a wireless communication apparatus includes a transmission control unit and a reception control unit. In the third embodiment, differences from the first and second embodiments will be described.

Figure 15:
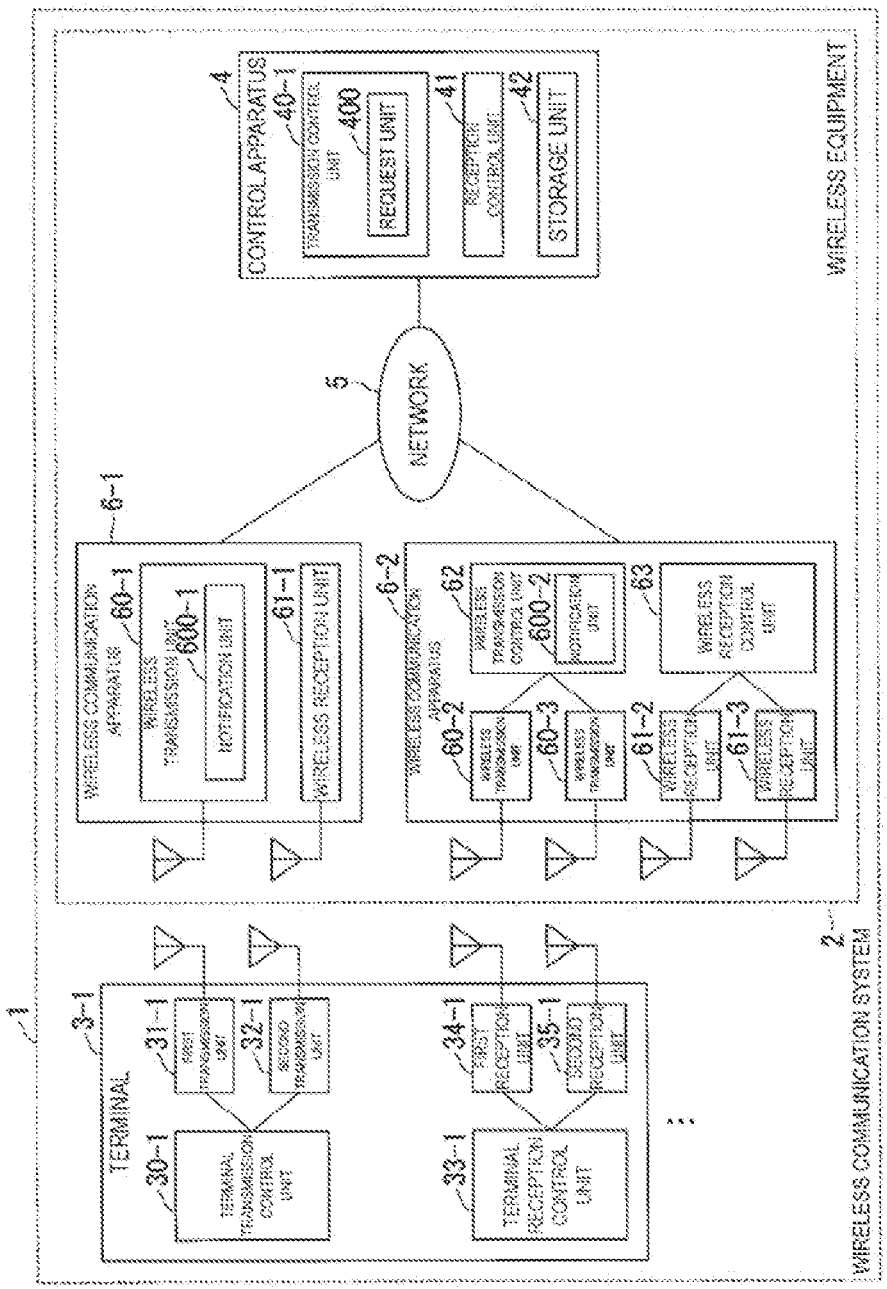
FIG. 15 is a diagram illustrating an example of a configuration of a wireless communication system in a third embodiment.

FIG. 15 is a diagram illustrating an example of a configuration of a wireless communication system 1. A wireless communication apparatus 6 includes a plurality of wireless transmission units 60, a plurality of wireless reception units 61, a wireless transmission control unit 62, and a wireless reception control unit 63. In FIG. 15, each of the wireless transmission units 60 may not include a notification unit 600.

The wireless transmission control unit 62 executes control related to the transmission of wireless frames of wireless transmission units 60-2 and 60-3. The wireless transmission control unit 62 includes the notification unit 600. The notification unit 600 of the wireless transmission control unit 62 notifies a requesting unit 400 of a retransmission state (the number of retransmissions or the like) of wireless frames transmitted to a terminal 3 from the wireless transmission units 60-2 and 60-3.

The wireless reception control unit 63 executes control related to the reception of wireless frames of the wireless reception units 61-2 and 61-3. The wireless reception control unit 63 acquires packets of wireless frames received by the wireless reception unit 61-2. Similarly, the wireless reception control unit 63 acquires packets of wireless frames received by the wireless reception unit 61-3. The wireless reception control unit 63 transmits the received packet to a reception control unit 41.

As described above, the wireless communication apparatus 6 of the third embodiment includes the plurality of wireless transmission units 60 and the notification unit 600. The notification unit 600 notifies the request unit 400 of a retransmission state (the number of retransmissions or the like) of wireless frames transmitted from the plurality of wireless transmission units 60 to the terminal 3. As a result, the wireless communication system 1 of the third embodiment can improve reliability with respect to a wireless frame arrival probability while reducing the amount of communication of a wireless frame for redundant communication, even when the wireless communication apparatus 6 includes the plurality of wireless transmission units 60 and the wireless reception unit 61.

The embodiments of the present invention have been described above in detail with reference to the drawings. However, specific configurations are not limited to those embodiments, and include any design or the like within the scope not departing from the gist of the present invention.

The terminals, the control apparatuses, and the wireless communication apparatuses in the above-described embodiments may be achieved by a computer. In such a case, the terminals, the control apparatuses, and the wireless communication apparatuses may be achieved by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

INDUSTRIAL APPLICABILITY

The present disclosure is applicable to wireless communication systems.

REFERENCE SIGNS LIST

1 Radio communication system
2 wireless equipment
3 Terminal
4 Control apparatus
5 Network
6 Wireless communication apparatus
30 Terminal transmission control unit
31 First transmission unit
32 Second transmission unit
33 Terminal reception control unit
34 First reception unit
35 Second reception unit
40 Communication control unit
41 Reception control unit
42 Storage unit
60 wireless transmission unit
61 wireless reception unit
62 wireless transmission control unit
63 Wireless reception control unit
400 Request unit
600 Notification unit

The invention claimed is:

1. A wireless communication system comprising:
a plurality of wireless communication apparatuses that transmit a wireless frame to a terminal; and
a control apparatus,
wherein the plurality of wireless communication apparatuses transmit information representing the number of retransmissions of the wireless frame to the control apparatus, and
the control apparatus acquires the information representing the number of retransmissions of the wireless frame, assigns a priority for each of the wireless communication apparatuses, selects a given wireless communication apparatus of the plurality of wireless communication apparatuses in accordance with the number of retransmissions and a priority assigned to each of the wireless communication apparatuses, and causes the selected wireless communication apparatus to start transmitting the wireless frame, where the given wireless communication apparatus differs from the wireless communication apparatus that initially sent the wireless frame to the terminal; wherein the control apparatus determines a priority for each of the plurality of wireless communication apparatuses on the basis of at least one of a cost of communication of the wireless communication apparatus and a loss probability of the wireless frame of the wireless communication apparatus.

2. The wireless communication system according to claim 1, wherein the control apparatus determines a priority for each of the plurality of wireless communication apparatuses using a table residing on a storage medium of the control apparatus.

3. A control method executed by a wireless communication system including a plurality of wireless communication apparatuses for transmitting a wireless frame to a terminal and a control apparatus, the control method comprising:
causing the plurality of wireless communication apparatuses to transmit information representing the number of retransmissions of the wireless frame to the control apparatus; and
causing the control apparatus to assign a priority for each of the plurality of wireless communication apparatus, acquire the information representing the number of retransmissions of the wireless frame, select two or more wireless communication apparatus of the plurality of wireless communication apparatuses in accordance with the number of retransmissions and a priority assigned to each of the plurality of wireless communication apparatuses such that the wireless communication apparatuses having highest priority are selected, and cause the selected wireless communication apparatus to start transmitting the wireless frame, wherein the priority to each of the plurality of wireless communication apparatuses is assigned on the basis of at least one of a cost of communication of the wireless communication apparatus and a loss probability of the wireless frame of the wireless communication apparatus.

4. The control method according to claim 3, wherein the control apparatus determines a priority for each of the plurality of wireless communication apparatus using a table residing in a storage medium of the control apparatus.

5. A control apparatus that controls a plurality of wireless communication apparatuses for transmitting a wireless frame to a terminal, the control apparatus comprising:
a processor; and
a storage medium having computer program instructions stored thereon, when executed by the processor, perform to:
receives, from the plurality of wireless communication apparatuses, information representing the number of retransmissions of the wireless frame;
assigns a priority to each of the plurality of wireless communication apparatuses, wherein the priority to each of the plurality of wireless communication apparatuses is assigned on the basis of at least one of a cost of communication of the wireless communication apparatus and a loss probability of the wireless frame of the wireless communication apparatus;
selects two or more wireless communication apparatus of the plurality of wireless communication apparatuses in accordance with the number of retransmissions and a priority assigned to each of the plurality of wireless communication apparatuses such that the wireless communication apparatuses having highest priority are selected, and
causes the selected wireless communication apparatuses to start transmitting the wireless frame.

6. The control apparatus according to claim 5, wherein the computer program instructions further perform to determines a priority for each of the plurality of the wireless communication apparatus using a table residing on a storage medium of the control apparatus.

7. A non-transitory computer-readable medium having computer-executable instructions that, upon execution of the instructions by a processor of a computer, cause the computer to function as control program causing a computer to function as the control apparatus according to claim 5.

* * * * *